US012760155B2

(12) United States Patent
Wang et al.

(10) Patent No.: US 12,760,155 B2
(45) Date of Patent: Oct. 13, 2026

(54) POLYOLEFIN COMPOSITION WITH IMPROVED IMPACT AND WHITENING RESISTANCE

(71) Applicant: BOREALIS AG, Vienna (AT)

(72) Inventors: Jingbo Wang, Linz (AT); Markus Gahleitner, Linz (AT); Friedrich Berger, Linz (AT); Klaus Bernreitner, Linz (AT); Pauli Leskinen, Linz (AT)

(73) Assignee: BOREALIS AG, Vienna (AT)

( * ) Notice: Subject to any disclaimer, the term of this patent is extended or adjusted under 35 U.S.C. 154(b) by 660 days.

(21) Appl. No.: 17/291,217

(22) PCT Filed: Oct. 16, 2019

(86) PCT No.: PCT/EP2019/078038
§ 371 (c)(1),
(2) Date: May 4, 2021

(87) PCT Pub. No.: WO2020/094347
PCT Pub. Date: May 14, 2020

(65) Prior Publication Data

US 2021/0363314 A1 Nov. 25, 2021

(30) Foreign Application Priority Data

Nov. 7, 2018 (EP) .................................... 18204832

(51) Int. Cl.
*C08J 5/18* (2006.01)
*C08L 23/14* (2006.01)

(52) U.S. Cl.
CPC ................ *C08J 5/18* (2013.01); *C08L 23/14* (2013.01); *C08J 2323/14* (2013.01); *C08J 2423/08* (2013.01); *C08J 2423/14* (2013.01); *C08L 2203/16* (2013.01); *C08L 2205/025* (2013.01); *C08L 2205/035* (2013.01); *C08L 2207/02* (2013.01); *C08L 2314/06* (2013.01)

(58) Field of Classification Search
CPC .................................. C08J 5/18; C08L 23/14
USPC ........................................................ 525/240
See application file for complete search history.

(56) References Cited

U.S. PATENT DOCUMENTS 3,324,093 A 6/1967 Alleman
3,405,109 A 10/1968 Rohlfing
4,543,399 A 9/1985 Jenkins, III et al.
4,582,816 A 4/1986 Miro
(Continued)

FOREIGN PATENT DOCUMENTS

CN 103717667 A 4/2014
CN 107001663 A 8/2017
(Continued)

OTHER PUBLICATIONS

Baumgartel M, Winter HH, "Determination of the discrete relaxation and retardation time spectra from dynamic mechanical data", Rheol Acta 28:511519 (1989); 9 pgs.
(Continued)

*Primary Examiner* — Randy P Gulakowski
(74) *Attorney, Agent, or Firm* — Tarolli, Sundheim, Covell & Tummino LLP

(57) ABSTRACT

The invention is related to polymer compositions combining high impact strength with good haze and additionally showing good stress whitening resistance.

11 Claims, 1 Drawing Sheet schematic representation of experimental set up for stress whitening measurement

(56) References Cited

U.S. PATENT DOCUMENTS

| | | | | |
|---|---|---|---|---|
| 4,621,952 | A | 11/1986 | Aronson | |
| 5,391,654 | A | 2/1995 | Ahvenainen | |
| 2014/0303308 | A1* | 10/2014 | Grestenberger | C08L 23/10 525/240 |
| 2014/0316048 | A1* | 10/2014 | Fantinal | C08L 23/10 524/451 |
| 2017/0327678 | A1* | 11/2017 | Kela | C08F 210/16 |
| 2018/0010304 | A1* | 1/2018 | Bonavoglia | D01F 6/30 |

FOREIGN PATENT DOCUMENTS

| | | | |
|---|---|---|---|
| CN | 107922695 | A | 4/2018 |
| EP | 0188125 | A2 | 7/1986 |
| EP | 0250169 | A2 | 12/1987 |
| EP | 0579426 | A1 | 1/1994 |
| EP | 699213 | B1 | 2/1998 |
| EP | 0887379 | A1 | 12/1998 |
| EP | 0887380 | A1 | 12/1998 |
| EP | 0887381 | A1 | 12/1998 |
| EP | 0696293 | B1 | 5/2000 |
| EP | 1236769 | A1 | 9/2002 |
| EP | 1310295 | A1 | 5/2003 |
| EP | 1415999 | A1 | 5/2004 |
| EP | 1510547 | A | 3/2005 |
| EP | 1591460 | A1 | 11/2005 |
| EP | 991684 | B1 | 1/2006 |
| EP | 1739103 | A1 | 1/2007 |
| EP | 1752462 | B1 | 3/2009 |
| EP | 1828304 | B1 | 3/2009 |
| EP | 1702956 | B1 | 8/2010 |
| EP | 2586824 | A1 | 5/2013 |
| EP | 2592112 | A | 5/2013 |
| EP | 3257895 | A1 | 12/2017 |
| RU | 2011139191 | A | 5/2013 |
| WO | 92/12182 | A1 | 7/1992 |
| WO | 1994/25495 | A1 | 11/1994 |
| WO | 95/12622 | A1 | 5/1995 |
| WO | 199632423 | A1 | 10/1996 |
| WO | 199728170 | A1 | 8/1997 |
| WO | 199832776 | A1 | 7/1998 |
| WO | 199961489 | A1 | 12/1999 |
| WO | 2000/29452 | A1 | 5/2000 |
| WO | 200026258 | A1 | 5/2000 |
| WO | 2003010208 | A1 | 2/2003 |
| WO | 2003/051934 | | 6/2003 |
| WO | 2003051514 | A1 | 6/2003 |
| WO | 2004085499 | A2 | 10/2004 |
| WO | 2007/025640 | A1 | 3/2007 |
| WO | 2016083208 | A1 | 6/2016 |
| WO | 2017/25268 | A1 | 2/2017 |
| WO | 199618662 | A1 | 6/2021 |

OTHER PUBLICATIONS

John Dealy & Ronald G. Larson; "Linear Viscoelasticity—Fundamental"; Structure and Rheology of Molten Polymers; Hanser 2006, 21 pgs.

Hagström, et al.; The Polymer Processing Society, Extended Abstracts & Final Programme, Europe/Africa Region Meeting Gothenburg, Sweden, Aug. 19-21, 1997 Conference of Polymer Processing; 3 pgs.

Applicant: Borealis AG; International PCT Application No. PCT/EP209/078038; PCT Notification of Transmittal of the International Preliminary Report on Patentability; Authorized Officer: Rosselia Pittorru; May 27, 2020; 14 pgs.

Applicant: Borealis AG, AT; "Polyolefin Composition With Improved Impact and Whitening Resistance"; Russian Application No. 2021116030/04(033817) Filed Oct. 16, 2019; Russian Office Action dated Nov. 19, 2021; 16 pgs.

Zhang, et al. Research Progress on Stress Whitening Phenomena in Polymer Materials, 2012; 5 pgs.

Liberman, et al; Poly(propylene) Heterophasic Copolymers Molecular Structure Analysis through Fractionation Techniques, 2013; 13 pgs.

* cited by examiner

Figure 1: schematic representation of experimental set up for stress whitening measurement
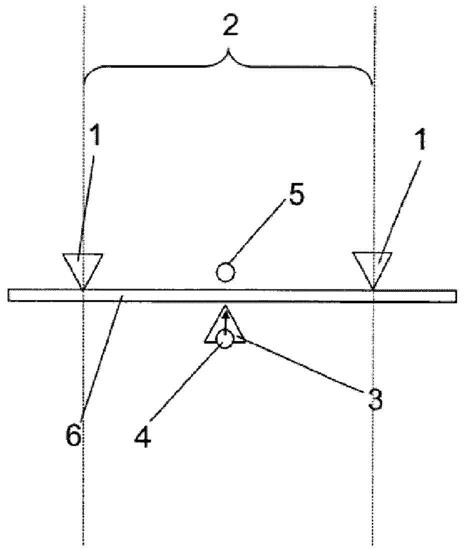
Figure 2: schematic diagram of the function recorded during stress whitening experiment
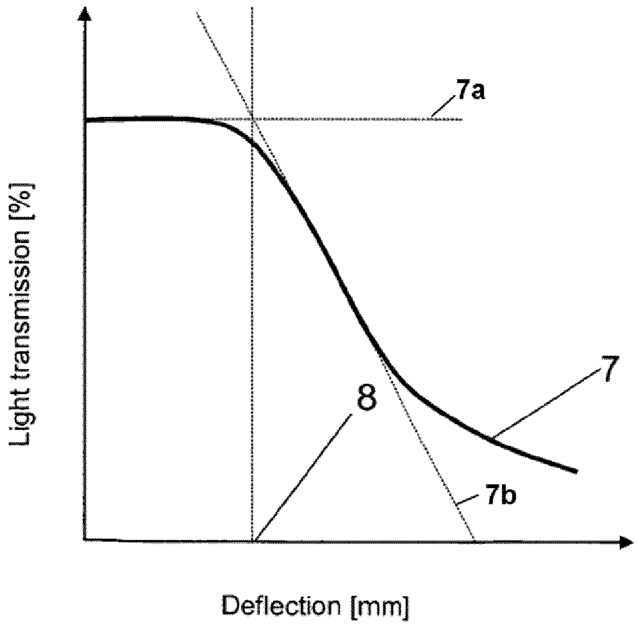

POLYOLEFIN COMPOSITION WITH IMPROVED IMPACT AND WHITENING RESISTANCE

The present invention relates to polyolefin compositions having good impact strength with good whitening resistance characteristics.

Polypropylenes are widely used in a lot of application areas, like moulding, tubing, pipe, lids, etc. due to their good combination of cost, performance and processability. Nowadays, due to the higher life standards and more strict requirements, specific properties like high flow (energy saving and long flow length for thinner wall) and a good combination of stiffness, toughness and transparency, in the sense of low haze, become continuously more important.

It is further important, that the polymers provide good optical properties in the sense of low haze and good transparency despite having undergone mechanical deformation. I.e. there is a strong requirement for polypropylene having a low tendency to stress whitening. Such stress whitening marks are disturbing the optical performance and impression of injection moulded final articles strongly and should therefore be avoided.

In order to improve the impact behaviour of polypropylene, some rubber phase is required. It is well known in the art, that the rubber phase normally is incompatible with the matrix and therefore the optical properties will deteriorate, resulting in limited transparency, high haze and a strong tendency towards stress whitening.

It is further well known in the art, that rubber phases can be incorporated into the polypropylene resulting in a multiphase or heterophasic polymer system. Said incorporation can be done either by in-situ multi-stage polymerization or by incorporation of an external rubber. The person skilled however is further well aware, that such multiphase systems with stiff matrix and therein dispersed elastomer or core-shell particles are very sensitive to stress whitening or blushing. This is especially true for multiphase systems having high rubber content.

Stress whitening results from internal cavitation on the particle/matrix interface or inside the rubber particles of the polymer. As said cavitation is related to energy dissipation in the failure process, it is also clear that stress whitening can hardly be avoided when designing materials combining a high level of toughness with high stiffness. While in case of failure, cracks are stopped and energy is dissipated at internal surfaces, this dissipation goes along with craze formation becoming visible in the deformation zone.

One way to improve the optical properties is to reduce the molecular weight of the rubber phase, but this may introduce further problems, namely a reduction of the toughening effect and possible problems during production and conversion due to stickiness of the polymer powder.

Stress whitening can alternatively be compensated by either using rubber phases of higher crystallinity or adding a high density polyethylene (HDPE) component. Both approaches are, however, also known to reduce transparency or increase haze respectively.

EP 2586824 describes a polymer composition comprising (A) a polypropylene copolymer having below 4.0 wt % comonomer being C5 to C12 α-olefins, and (B) a propylene copolymer having a comonomer content of 4.0 to 20.0 wt %, the comonomers being C5 to C12 α-olefins, and (C) a low-crystalline polymer having a melting temperature of below 120° C., wherein further (i) the weight ratio of the polypropylene (A) to the propylene copolymer (B) is in the range of 20/80 to 80/20, and (ii) preferably the polymer composite comprises 5 to 50 wt % based on the total amount of polymer composite of low-crystalline polymer (C). The drawback of C3 rich rubber as modifier is that the optical behaviour can only be accomplished on the expense of impact strength in low temperature.

EP 1828304 claims a PP composition comprising (a) 50-77 wt % of a crystalline propylene polymer having an amount of isotactic pentads (mmmm), measured by 13C-NMR on the XCI fraction, higher than 97.5 mol % and a polydispersity index ranging from 4 to 10; (b) 13-28 wt % of an elastomeric copolymer of ethylene and propylene having a C2 content from 30 to 70 wt % and exhibiting an XCI fraction of less than 45 wt %, the XCS fraction having an intrinsic viscosity value ranging from 2 to 4 dl/g; and (c) 10-22 wt % of PE homopolymer or ethylene-propylene copolymer having a comonomer content lower than 10 wt % and an intrinsic viscosity value ranging from 1 to 3 dl/g; in said composition component (b) plus component (c) being in amount of at least 25 wt %. In this patent HDPE is used as modifier to reduce stress whitening in a polypropylene HECO material, resulting in the aforementioned disadvantages.

EP 1702956 claims polyolefin compositions with good impact strength and transparency comprising (a) 85-98 wt % based on the total weight of the composition of a heterophasic propylene/α-olefin copolymer comprising a polymer or copolymer of propylene and an α-olefin with 0-15 mol % of the α-olefin as matrix polymer and a propylene/α-olefin rubber copolymer comprising 20-80 mol % of the α-olefin and (b) 15-2 wt % based on the total weight of the composition of an ethylene homopolymer, the ethylene homopolymer having a density lower than 0,920 g/cm$^3$ according to ISO1183. In this patent LDPE is used as modifier to reduce stress whitening in polypropylene, thus limiting the stiffness of the resulting composition.

Accordingly, it is an object of the invention to provide polyolefin compositions for packaging applications with improved impact strength at ambient and low temperatures, and good optical properties, especially a low tendency to stress whitening after deformation.

The present invention is based on the finding that the above object can be achieved by introducing a particular linear low density ethylene terpolymer (LLDPE) into a heterophasic propylene copolymer system (HECO). Surprisingly it has been found that such polymer composition provides both good impact behaviour and good optical properties, especially good resistance to stress whitening.

Accordingly, the present invention is directed to a polymer composition comprising a) 95.0 to 70.0 wt % of a heterophasic propylene copolymer (HECO) comprising 70.0 to 90.0 wt % of a polypropylene matrix (M) and 10.0 to 30.0 wt % of an elastomeric propylene copolymer (EPC) dispersed in said matrix (M), wherein the ethylene comonomer content in the polypropylene matrix (M) is in the range of 0.0-10.0 wt % and wherein the heterophasic propylene copolymer (HECO) has a melt flow rate $MFR_2$ (2.16 kg, 230° C.) measured according to ISO 1133 in the range of 0.5 to 20.0 g/10 min, and b) 5.0 to 30.0 wt % of a bi- or multimodal polyethylene (LLDPE) being a terpolymer of ethylene and two different comonomers selected from alpha olefins having from 4 to 10 carbon atoms and being produced with a metallocene catalyst, wherein the bi- or multimodal polyethylene terpolymer has i. an $MFR_2$ (2.16 kg, 190° C.) measured according to ISO 1133 of 0.5 to 10 g/10 min, ii. an MWD (Mw/Mn) of 2.0 to 5.0, and iii. a density measured according to ISO 1183 of 890 to 925 kg/$m^3$, and wherein the bi- or multimodal polyethylene (LLDPE) comprises at least a first ethylene polymer component (A) having an melt flow rate $MFR_2$ (2.16 kg, 190° C.) measured according to ISO 1133 in the range of 1.0 to 10.0 g/10 min, and a second ethylene polymer component (B) having an melt flow rate $MFR_2$ (2.16 kg, 190° C.) measured according to ISO 1133 in the range of 0.2 to 1.0 g/1.0 min.

In a further embodiment the invention is related to an article comprising said polymer composition, preferably to an injection moulded article comprising said composition.

DETAILED DESCRIPTION OF THE INVENTION

In the following the individual components are defined in more detail.

Heterophasic Propylene Copolymer (HECO)

It is essential that the polymer composition in the present invention comprises 95.0 to 70.0 wt %, preferably 92.0 to 75.0 wt %, or more preferably 90.0 to 80.0 wt % of a heterophasic propylene copolymer (HECO).

The term "heterophasic propylene copolymer (HECO)" used herein denotes compositions comprising a crystalline polypropylene matrix resin and an elastomeric propylene copolymer dispersed in said matrix resin, and optionally a crystalline ethylene copolymer (CEC), and further optionally a nucleating agent.

In the present invention, the term "matrix" is to be interpreted in its commonly accepted meaning, i.e. it refers to a continuous phase (in the present invention a continuous polymer phase) in which isolated or discrete particles such as rubber particles may be dispersed.

Furthermore the terms "elastomeric propylene copolymer (EPC)", "xylene cold soluble (XCS) fraction of the heterophasic propylene copolymer", "dispersed phase" and "ethylene propylene rubber" denote the same, i.e. are interchangeable.

The expression "heterophasic" indicates that the elastomeric propylene copolymer (EPC) is preferably (finely) dispersed at least in the polypropylene matrix (M) of the heterophasic propylene copolymer (HECO). In other words the elastomeric copolymer (E) forms inclusions in the polypropylene matrix (M). The term "inclusion" according to this invention shall preferably indicate that the matrix and the inclusion form different phases within the heterophasic propylene copolymer (HECO), said inclusions are for instance visible by high resolution microscopy, like electron microscopy or scanning force microscopy.

According to the present invention, said heterophasic propylene copolymer (HECO) has a melt flow rate $MFR_2$ (2.16 kg, 230° C.) measured according to ISO 1133 in the range of 0.5 to 20.0 g/10 min, preferably in the range of 0.5 to 18.0 g/10 min, more preferably in the range of 0.6 to 15.0 g/10 min, even more preferably in the range of 0.7 to 12.0 g/10 min.

The heterophasic propylene copolymer (HECO) comprises 70.0 to 90.0 wt %, preferably 75.0 to 90.0 wt %, more preferably 77.0 to 85.0 wt % of the polypropylene matrix (M) and 10.0 to 30.0 wt %, preferably 10.0 to 25.0 wt %, more preferably 15.0 to 23.0 wt % of the elastomeric propylene copolymer (EPC), based on the total weight of the heterophasic propylene copolymer (HECO).

As first component in the heterophasic propylene copolymer (HECO), the polypropylene matrix (M) can be a propylene homopolymer (H-PP) or a random propylene copolymer (RC-PP). Preferably the polypropylene matrix (M) is a propylene homopolymer (H-PP).

The term "random propylene copolymer" denotes a copolymer of propylene monomer units and comonomer units, in which the comonomer units are randomly distributed in the polymeric chain. Thus, a random copolymer is different from a heterophasic copolymer comprising a matrix phase and an elastomeric phase dispersed therein, as described in detail above. Accordingly, the random propylene copolymer (RC-PP) does not contain an elastomeric polymer phase dispersed therein, i.e. is monophasic and has just one glass transition temperature.

In one of the preferred embodiments of the present invention, the polypropylene matrix (M) has a rather low xylene cold soluble (XCS) content, i.e. of not more than 3.0 wt %, preferably not more than 2.6 wt %, like not more than 2.4 wt %, based on the total weight of the polypropylene matrix (M). Thus, a preferred range is 1.0 to 3.0 wt %, more preferred 1.2 to 2.6 wt %, based on the total weight of the polypropylene matrix (M).

In one embodiment of the present invention, the polypropylene matrix (M) has a melt flow rate $MFR_2$ (2.16 kg, 230° C.) of from 0.3 to 30.0 g/10 min, more preferably of from 0.5 to 25.0 g/10 min, still more preferably of from 0.7 to 20.0 g/10 min.

If the polypropylene matrix (M) is a random propylene copolymer (RC-PP), the random propylene copolymer (RC-PP) preferably comprises, preferably consist of, units derived from (i) propylene and (ii) ethylene and/or at least one $C_4$ to $C_8$ α-olefin, preferably at least one α-olefin selected from the group consisting of ethylene, 1-butene, 1-pentene, 1-hexene and 1-octene, more preferably ethylene and/or 1-butene, yet more preferably ethylene.

Accordingly, the random propylene copolymer (RC-PP) may comprise units derived from (i) propylene and (ii) ethylene and/or at least one $C_4$ to $C_8$ α-olefin. In one embodiment of the present invention the random propylene copolymer (RC-PP) comprises units derived from (i) propylene and (ii) at least one o-olefin selected from the group consisting of ethylene, 1-butene, 1-hexene and 1-octene. It is in particular preferred that the random propylene copolymer (RC-PP) consists of units derived from propylene and ethylene.

The ethylene comonomer content in the polypropylene matrix (M) is in the range of 0.0 to 10.0 wt %, preferably of 0.0 to 7.0 wt %, more preferably of 0.0 to 6.0 wt %, still more preferably of 0.0 to 5.0 wt %, based on the total weight of the polypropylene matrix (M).

The second component of the heterophasic propylene copolymer (HECO) is the elastomeric propylene copolymer (EPC). In the following the elastomeric propylene copolymer (EPC) is defined more precisely.

Preferably the elastomeric propylene copolymer (EPC) comprises units derived from (i) propylene and (ii) ethylene and/or $C_4$ to $C_{20}$ α-olefins, preferably from (i) propylene and (ii) selected from the group consisting of ethylene, 1-butene, 1-hexene, and 1-octene. Preferably the propylene content in the elastomeric propylene copolymer (EPC) is at least 40.0 wt %, more preferably at least 45.0 wt %. Thus in one preferred embodiment the elastomeric propylene copolymer (EPC) comprises 40.0 to 85.0 wt %, more preferably 45.0 to 80.0 wt % units derivable from propylene. The comonomers present in the elastomeric propylene copolymer (EPC) are preferably ethylene and/or $C_4$ to $C_{20}$ α-olefins, like ethylene, 1-butene, 1-hexene and 1-octene. In one specific embodiment elastomeric propylene copolymer (EPC) is a propylene ethylene polymer. In one embodiment of the present invention, the elastomeric propylene copolymer (EPC) is an ethylene propylene rubber (EPR) with the amounts given in this paragraph.

Preferably the xylene cold soluble content (XCS) of the heterophasic propylene copolymer (HECO) determined according ISO 16152 (25° C.) is in the range of 10.0 to 30.0 wt %, preferably in the range of 10.0 to 25.0 wt %, more preferably in the range of 12.0 to 20.0 wt %.

The intrinsic viscosity (IV) of the xylene cold soluble (XCS) fraction of the heterophasic propylene copolymer (HECO) is preferably moderate. Accordingly, it is appreciated that the intrinsic viscosity of the xylene cold soluble (XCS) fraction of the heterophasic propylene copolymer (HECO) is in the range of 1.5 to 4.5 dl/g, preferably in the range of 1.8 to 4.0 dl/g, more preferably 2.0 to 3.8 dl/g.

It is especially preferred that the heterophasic propylene copolymer (HECO) comprises a propylene ethylene polymer. And it is preferred that the ethylene comonomer content of xylene cold soluble (XCS) fraction of the heterophasic propylene copolymer (HECO) is in the range of 20.0 to 60.0 wt %, preferably in the range of 25.0 to 55.0 wt %, more preferably in the range of 25.0 to 50.0 wt %.

It is further preferred that the total ethylene comonomer content based on the amount of heterophasic propylene copolymer (HECO) is in the range of from more than 3.0 to 15.0 wt %, preferably from 4.0 to 13.0 wt %, more preferably from 4.5 to 12.0 wt %.

The heterophasic propylene copolymer (HECO) in accordance with the present invention may be prepared by any suitable process, including in particular blending processes such as mechanical blending including mixing and melt blending processes and any combinations thereof as well as in-situ blending during the polymerization process. These can be carried out by methods known to the skilled person, including batch processes and continuous processes.

Bi- or Multimodal Polyethylene (mPE)

According to the present invention the polymer composition comprises another essential component which is a bi- or multimodal polyethylene (mPE) being a terpolymer of ethylene and two different comonomers selected from alpha olefins having from 4 to 10 carbon atoms and being produced with a metallocene catalyst. The amount of the bi- or multimodal polyethylene (mPE) is from 5.0 to 30.0 wt %, preferably 8.0-25.0 wt %, more preferably 10.0-20.0 wt % based on the amount of the polymer composition.

The bi- or multimodal polyethylene (LLDPE) comprises at least a first ethylene polymer component (A) and a second ethylene polymer component (B).

The term "bi- or multimodal" in context of bi- or multimodal polyethylene terpolymer means herein multimodality with respect to melt flow rate (MFR) of the ethylene polymer components (A) and (B), i.e. the ethylene polymer components (A) and (B) have different MFR values. The multimodal polyethylene terpolymer can have further multimodality with respect to one or more further properties between the ethylene polymer components (A) and (B), as will be described later below.

As already mentioned above, the polyethylene is referred herein as "bi- or multimodal", since the ethylene polymer component (A) and the ethylene polymer component (B) have been produced under different polymerization conditions resulting in different Melt Flow Rates (MFR, e.g. $MFR_2$). I.e. the polyethylene is bi- or multimodal at least with respect to difference in MFR of the two ethylene polymer components (A) and (B).

The ethylene polymer component (A) has an $MFR_2$ of 1.0 to 10 g/10 min, preferably of 1.5 to 9.0 g/10 min and more preferably of 2.0 to 8.5 g/10 min.

The ethylene polymer component (B) has an $MFR_2$ of 0.2 to 1.0 g/10 min, preferably of 0.2 to 0.8 g/10 min, more preferably of 0.2 to 0.7 g/10 min, still more preferably of 0.2 to 0.6 g/10 min.

If the $MFR_2$ of ethylene polymer components, e.g. component (B), cannot be measured, because it cannot be isolated from the mixture of at least ethylene polymer components (A) or (B), then it can be calculated ($MI_2$ below) using so called Hagström equation (Hagström, The Polymer Processing Society, Europe/Africa Region Meeting, Gothenburg, Sweden, Aug. 19-21, 1997):

$$MI_b = \left(w \cdot MI_1^{-\frac{w^{-b}}{a}} + (1-w) \cdot MI_2^{-\frac{w^{-b}}{2a}}\right)^{-a \cdot w^b} \quad \text{(eq. 3)}$$

According to said Hagström, in said equation (eq.3), a=5.2 and b=0.7 for $MFR_2$. Furthermore, w is the weight fraction of the other ethylene polymer component, e.g. component (A), having higher MFR. The ethylene polymer component (A) can thus be taken as the component 1 and the ethylene polymer component (B) as the component 2. $MI_b$ is the $MFR_2$ of the final polyethylene.

The $MFR_2$ of the ethylene polymer component (B) ($MI_2$) can then be solved from the equation when the MFR of the ethylene polymer component (A) ($MI_1$) and the final polyethylene ($MI_b$) are known.

The two alpha-olefin comonomers having from 4 to 10 carbon atoms of the polyethylene terpolymer are preferably 1-butene and 1-hexene.

In addition to multimodality with respect to, i.e. difference between, the MFR of the ethylene polymer components (A) and (B), the polyethylene terpolymer of the invention can also be bi- or multimodal e.g. with respect to one or both of the two further properties:

- Bi- or multimodality with respect to, i.e. difference between, the comonomer type or the comonomer content(s) present in the ethylene polymer components (A) and (B), or both the type and content(s) of comonomers present in the ethylene polymer components (A) and (B); and/or
- the density of the ethylene polymer components (A) and (B).

Preferably, the bi- or multimodal polyethylene terpolymer is further bi- or multimodal with respect to comonomer type and/or comonomer content (mol %), preferably wherein the alpha-olefin comonomer having from 4 to 10 carbon atoms of ethylene polymer component (A) is different from the alpha-olefin comonomer having from 4 to 10 carbon atoms of ethylene polymer component (B), preferably wherein the alpha-olefin comonomer having from 4 to 10 carbon atoms of ethylene polymer component (A) is 1-butene and the alpha-olefin comonomer having from 4 to 10 carbon atoms of ethylene polymer component (B) is 1-hexene.

Preferably, the ethylene polymer component (A) has a lower amount (mol %) of comonomer than the ethylene polymer component (B), e.g. the amount of comonomer, preferably of 1-butene in the ethylene polymer component (A) is from 0.05 to 0.9 mol %, more preferably from 0.1 to 0.8 mol %, whereas the amount of comonomer, preferably of 1-hexene in the ethylene polymer component (B) is from 1.0 to 5.0 mol %, more preferably from 1.2 to 3.5 mol %.

The comonomer content of component (A) and (B) can be measured, or, in case, and preferably, one of the components is produced first and the other thereafter in the presence of the first produced in a so called multistage process, then the comonomer content of the first produced component, e.g. component (A), can be measured and the comonomer content of the other component, e.g. component (B), can be calculated according to following formula:

Comonomer content (mol %) in component *B*=(comonomer content (mol %) in final product−(weight fraction of component *A**comonomer content (mol %) in component *A*))/(weight fraction of component *B*)

More preferably, the total amount of comonomers present in the bi- or multimodal polyethylene terpolymer is of 1.0 to 6.0 mol %, preferably of 1.2 to 5.5 mol % and more preferably of 1.3 to 5.0 mol %.

In addition it is further preferred that the bi- or multimodal polyethylene terpolymer is further bi- or multimodal with respect to a difference in density between the ethylene polymer component (A) and ethylene polymer component (B). Preferably, the density of ethylene polymer component (A) is higher, than the density of the ethylene polymer component (B). More preferably the density of the ethylene polymer component (A) is of 930 to 950 kg/$m^3$, preferably of 935 to 945 kg/$m^3$.

The density of the bi- or multimodal polyethylene terpolymer is in the range of 890 to 925 kg/$m^3$, preferably of 900 to 925 kg/$m^3$, more preferably of 910 to 920 kg/$m^3$. The bi- or multimodal polyethylene terpolymer is preferably a linear low density polyethylene (LLDPE), which has a well-known meaning.

Additionally, the polyethylene terpolymer can also be multimodal with respect to, i.e. have difference between, the (weight average) molecular weight of the ethylene polymer components (A) and (B). The multimodality re weight average molecular weight means that the form of the molecular weight distribution curve, i.e. the appearance of the graph of the polymer weight fraction as function of its molecular weight, of such a bi- or multimodal polyethylene terpolymer will show two or more maxima or at least be distinctly broadened in comparison with the curves for the individual components.

The molecular weight distribution (MWD, Mw/Mn) of the polyethylene terpolymer of the present invention is in a range of 2.0 to 7.0, preferably in a range of 2.2 to 6.0 and more preferably in a range of 2.4 to 5.0, like in the range of 2.5 to 4.8.

Preferably, the bi- or multimodal polyethylene terpolymer comprises the ethylene polymer component (A) in an amount of 30 to 70 wt %, more preferably of 35 to 60 wt %, and still more preferably of 40 to 45 wt %, and the ethylene polymer component (B) in an amount of 70 to 30, more preferably of 65 to 40, and still more preferably of 60 to 55 wt %. Most preferably, the polyethylene terpolymer consists of the ethylene polymer components (A) and (B) as the sole polymer components.

The bi- or multimodal polyethylene terpolymer of the present invention is further defined by its rheological properties related to the relaxation spectrum index (RSI).

The bi- or multimodal polyethylene terpolymer of the present invention has a quite high relaxation spectrum index (RSI) that makes it ideal for blown film.

In typical film blowing process, a polymer melt is exposed to deformations varying in both time scale and shear force (viz. Shear in extruder and elongational deformation in film blowing) and residual shear stress is then relaxed during the subsequent crystallization process. In many processes, melt stress simultaneously grows and decays so characterizing time-dependent stress relaxation is important. Stress-strain behaviour in polymer processing is determined by the relaxation spectrum.

The quite narrow molecular weight distribution of the bi- or multimodal polyethylene of the present invention affects their relaxation spectra, the breadth of which is quantified by RSI. This dimensionless index is a sensitive, reliable indicator of long-range melt state order. RSI takes into account the effect of the breadth of the MWD and long chain branching (LCB) level on the relaxation time distribution.

The bi- or multimodal polyethylene terpolymer of the present invention is characterized by the absence of such LCB and by a quite narrow molecular weight distribution, since it is produced by using a metallocene catalyst, as will be described in more detail below. These two facts influence the RSI of the inventive terpolymers and differentiates the inventive terpolymer from other polyethylenes, such as polyethylenes being produced with a Ziegler-Natta catalyst, or polyethylenes having LCBs, etc.

Thus the bi- or multimodal polyethylene terpolymer of the present invention is characterized by a Relaxation Spectrum Index (RSI) (determined as defined in the description under Experimental part using frequency sweep at 190° C.) between 3.0 and 5.5, preferably between 3.5 to 5.0 for the density range of 915 to <920 kg/$m^3$ (according to ISO 1183) and between 6.8 and 9.0, preferably between 6.9 and 8.0 for the density range of 920 to 925 kg/$m^3$ (according to ISO 1183).

The normalized Relaxation Spectrum Index (nRSI) is defined as RSI/$MFR_2$. The bi- or multimodal polyethylene terpolymer of the present invention is characterized by a nRSI in the range of 3.0 to 10.0, preferably in the range of 3.2 to 8.5.

The calculated Relaxation Spectrum Index (cRSI) is defined as RSI*$MFR_2$*MWD. The bi- or multimodal polyethylene terpolymer of the present invention is characterized by a cRSI in the range of 12.0 to 50.0, preferably in the range of 13.0 to 45.

The bi- or multimodal polyethylene terpolymer is produced using a metallocene catalyst. More preferably, the ethylene polymer components (A) and (B) of the polyethylene are preferably produced using a metallocene catalyst, which term has a well-known meaning in the art. The term "metallocene catalyst" means herein the catalytically active metallocene compound or complex combined with a cocatalyst. The metallocene compound or complex is referred herein also as organometallic compound (C).

The organometallic compound (C) comprises a transition metal (M) of Group 3 to 10 of the Periodic Table (IUPAC 2007) or of an actinide or lanthanide.

The term "an organometallic compound (C)" in accordance with the present invention includes any metallocene compound of a transition metal which bears at least one organic (coordination) ligand and exhibits the catalytic activity alone or together with a cocatalyst. The transition metal compounds are well known in the art and the present invention covers compounds of metals from Group 3 to 10, e.g. Group 3 to 7, or 3 to 6, such as Group 4 to 6 of the Periodic Table, (IUPAC 2007), as well lanthanides or actinides.

In an embodiment the organometallic compound (C) has the following formula (1):

$$(L)_m R_n M X_q \quad (1)$$

wherein

"M" is a transition metal (M) transition metal (M) of Group 3 to 10 of the Periodic Table (IUPAC 2007), each "X" is independently a monoanionic ligand, such as a σ-ligand, each "L" is independently an organic ligand which coordinates to the transition metal "M", "R" is a bridging group linking said organic ligands (L), "m" is 1, 2 or 3, preferably 2, "n" is 0, 1 or 2, preferably 1, "q" is 1, 2 or 3, preferably 2 and m+q is equal to the valency of the transition metal (M).

"M" is preferably selected from the group consisting of zirconium (Zr), hafnium (Hf), or titanium (Ti), more preferably selected from the group consisting of zirconium (Zr) and hafnium (Hf).

"X" is preferably a halogen, most preferably Cl.

Most preferably the organometallic compound (C) is a metallocene complex which comprises a transition metal compound, as defined above, which contains a cyclopentadienyl, indenyl or fluorenyl ligand as the substituent "L". Further, the ligands "L" may have substituents, such as alkyl groups, aryl groups, arylalkyl groups, alkylaryl groups, silyl groups, siloxy groups, alkoxy groups or other heteroatom groups or the like. Suitable metallocene catalysts are known in the art and are disclosed, among others, in WO-A-95/12622, WO-A-96/32423, WO-A-97/28170, WO-A-98/32776, WO-A-99/61489, WO-A-03/010208, WO-A-03/051934, WO A-03/051514, WO-A-2004/085499, EP-A-1752462 and EP-A-1739103.

Most preferred the metallocene catalyst, which means the catalytically active metallocene complex, as defined above, is used together with a cocatalyst, which is also known as an activator. Suitable activators are metal alkyl compounds and especially aluminium alkyl compounds known in the art. Especially suitable activators used with metallocene catalysts are alkylaluminium oxy-compounds, such as methylalumoxane (MAO), tetraisobutylalumoxane (TIBAO) or hexaisobutylalumoxane (HIBAO).

More preferably the ethylene polymer components (A) and (B) of the bi- or multimodal polyethylene are produced in the presence of the same metallocene catalyst.

The bi- or multimodal polyethylene terpolymer may be produced in any suitable polymerization process known in the art, which comprise at least one polymerization stage, where polymerization is typically carried out in solution, slurry, bulk or gas phase. Preferably the bi- or multimodal polyethylene terpolymer is produced in a multi-stage polymerization process comprising at least two polymerization zones.

The ethylene polymer component (A) is preferably produced in a first polymerization zone and the ethylene polymer component (B) is preferably produced in a second polymerization zone. The first polymerization zone and the second polymerization zone may be connected in any order, i.e. the first polymerization zone may precede the second polymerization zone, or the second polymerization zone may precede the first polymerization zone or, alternatively, polymerization zones may be connected in parallel. However, it is preferred to operate the polymerization zones in cascaded mode. The polymerization zones may operate in slurry, solution, or gas phase conditions or their combinations.

Suitable processes comprising cascaded slurry and gas phase polymerization stages are disclosed, among others, in WO-A-92/12182 and WO-A-96/18662.

It is often preferred to remove the reactants of the preceding polymerization stage from the polymer before introducing it into the subsequent polymerization stage. This is preferably done when transferring the polymer from one polymerization stage to another.

The catalyst may be transferred into the polymerization zone by any means known in the art. For example, it is possible to suspend the catalyst in a diluent and maintain it as homogeneous slurry, to mix the catalyst with a viscous mixture of grease and oil and feed the resultant paste into the polymerization zone or to let the catalyst settle and introduce portions of thus obtained catalyst mud into the polymerization zone.

The polymerization, preferably of the ethylene polymer component (A), in the first polymerization zone is preferably conducted in slurry. Then the polymer particles formed in the polymerization, together with the catalyst fragmented and dispersed within the particles, are suspended in the fluid hydrocarbon. The slurry is agitated to enable the transfer of reactants from the fluid into the particles.

The polymerization usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons and preferred diluent is propane.

The ethylene content in the fluid phase of the slurry may be from 2 to about 50% by mol, preferably from about 2 to about 20% by mol and in particular from about 3 to about 12% by mol.

The temperature in the slurry polymerization is typically from 50 to 115° C., preferably from 60 to 110° C. and in particular from 70 to 100° C. The pressure is from 1 to 150 bar, preferably from 10 to 100 bar.

The slurry polymerization may be conducted in any known reactor used for slurry polymerization.

Such reactors include a continuous stirred tank reactor and a loop reactor. It is especially preferred to conduct the polymerization in loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654.

It is sometimes advantageous to conduct the slurry polymerization above the critical temperature and pressure of the fluid mixture. Such operation is described in U.S. Pat. No. 5,391,654. In such operation the temperature is typically from 85 to 110° C., preferably from 90 to 105° C. and the pressure is from 30 to 150 bar, preferably from 50 to 100 bar.

The slurry may be withdrawn from the reactor either continuously or intermittently. A preferred way of intermittent withdrawal is the use of settling legs where slurry is allowed to concentrate before withdrawing a batch of the concentrated slurry from the reactor. The continuous withdrawal is advantageously combined with a suitable concentration method, e.g. as disclosed in EP-A-1310295 and EP-A-1591460.

Hydrogen may be fed into the reactor to control the molecular weight of the polymer as known in the art.

Furthermore, one or more alpha-olefin comonomers are added into the reactor e.g. to control the density of the polymer product. The actual amount of such hydrogen and comonomer feeds depends on the catalyst that is used and the desired melt index (or molecular weight) and density (or comonomer content) of the resulting polymer.

The polymerization of the ethylene polymer component (B), in the second polymerization zone is preferably conducted in gas phase, preferably in a fluidized bed reactor, in a fast fluidized bed reactor or in a settled bed reactor or in any combination of these. The polymerization in the second polymerization zone is more preferably conducted in a fluidized bed gas phase reactor, wherein ethylene is polymerized together with at least one comonomer in the presence of a polymerization catalyst and, preferably in the presence of the reaction mixture from the first polymerization zone comprising the ethylene polymer component (A) in an upwards moving gas stream. The reactor typically contains a fluidized bed comprising the growing polymer particles containing the active catalyst located above a fluidization grid.

The polymer bed is fluidized with the help of the fluidization gas comprising the olefin monomer, eventual comonomer(s), eventual chain growth controllers or chain transfer agents, such as hydrogen, and eventual inert gas. The fluidization gas is introduced into an inlet chamber at the bottom of the reactor. One or more of the above-mentioned components may be continuously added into the fluidization gas to compensate for losses caused, among other, by reaction or product withdrawal.

The fluidization gas passes through the fluidized bed. The superficial velocity of the fluidization gas must be higher that minimum fluidization velocity of the particles contained in the fluidized bed, as otherwise no fluidization would occur. On the other hand, the velocity of the gas should be lower than the onset velocity of pneumatic transport, as otherwise the whole bed would be entrained with the fluidization gas.

When the fluidization gas is contacted with the bed containing the active catalyst the reactive components of the gas, such as monomers and chain transfer agents, react in the presence of the catalyst to produce the polymer product. At the same time the gas is heated by the reaction heat.

The unreacted fluidization gas is removed from the top of the reactor and cooled in a heat exchanger to remove the heat of reaction. The gas is cooled to a temperature which is lower than that of the bed to prevent the bed from heating because of the reaction. It is possible to cool the gas to a temperature where a part of it condenses. When the liquid droplets enter the reaction zone they are vaporised.

The vaporisation heat then contributes to the removal of the reaction heat. This kind of operation is called condensed mode and variations of it are disclosed, among others, in WO-A-2007/025640, USA-4543399, EP-A-699213 and WO-A-94/25495. It is also possible to add condensing agents into the recycle gas stream, as disclosed in EP-A-696293. The condensing agents are non-polymerizable components, such as n-pentane, isopentane, n-butane or isobutane, which are at least partially condensed in the cooler.

The gas is then compressed and recycled into the inlet chamber of the reactor. Prior to the entry into the reactor fresh reactants are introduced into the fluidization gas stream to compensate for the losses caused by the reaction and product withdrawal. It is generally known to analyze the composition of the fluidization gas and introduce the gas components to keep the composition constant. The actual composition is determined by the desired properties of the product and the catalyst used in the polymerization.

The catalyst may be introduced into the reactor in various ways, either continuously or intermittently. Where the gas phase reactor is a part of a reactor cascade the catalyst is usually dispersed within the polymer particles from the preceding polymerization stage. The polymer particles may be introduced into the gas phase reactor as disclosed in EP-A-1415999 and WO-A-00/26258. Especially if the preceding reactor is a slurry reactor it is advantageous to feed the slurry directly into the fluidized bed of the gas phase reactor as disclosed in EP-A-887379, EP-A-887380, EP-A-887381 and EP-A-991684.

The polymeric product may be withdrawn from the gas phase reactor either continuously or intermittently. Combinations of these methods may also be used. Continuous withdrawal is disclosed, among others, in WO-A-00/29452. Intermittent withdrawal is disclosed, among others, in U.S. Pat. No. 4,621,952, EP-A-188125, EP-A-250169 and EP-A-579426.

Also antistatic agent(s), such as water, ketones, aldehydes and alcohols, may be introduced into the gas phase reactor if needed. The reactor may also include a mechanical agitator to further facilitate mixing within the fluidized bed.

Typically the fluidized bed polymerization reactor is operated at a temperature within the range of from 50 to 100° C., preferably from 65 to 90° C. The pressure is suitably from 10 to 40 bar, preferably from 15 to 30 bar.

The polymerization of the at least ethylene polymer component (A) and ethylene polymer component (B) in the first and second polymerization zones may be preceded by a prepolymerization step. The purpose of the prepolymerization is to polymerize a small amount of polymer onto the catalyst at a low temperature and/or a low monomer concentration. By prepolymerization it is possible to improve the performance of the catalyst in slurry and/or modify the properties of the final polymer.

The prepolymerization step may be conducted in slurry or in gas phase. Preferably prepolymerization is conducted in slurry, preferably in a loop reactor. The prepolymerization is then preferably conducted in an inert diluent, preferably the diluent is a low-boiling hydrocarbon having from 1 to 4 carbon atoms or a mixture of such hydrocarbons.

The temperature in the prepolymerization step is typically from 0 to 90° C., preferably from 20 to 80° C. and more preferably from 25 to 70° C.

The pressure is not critical and is typically from 1 to 150 bar, preferably from 10 to 100 bar.

The catalyst components are preferably all introduced to the prepolymerization step. Preferably the reaction product of the prepolymerization step is then introduced to the first polymerization zone.

Also preferably, as mentioned above, the prepolymer component is calculated to the amount of the ethylene polymer component (A).

It is within the knowledge of a skilled person to adapt the polymerization conditions in each step as well as feed streams and resident times to obtain the claimed bi- or multimodal polyethylene terpolymer.

The bi- or multimodal polyethylene terpolymer comprising at least, and preferably solely, the ethylene polymer components (A) and (B) obtained from the second polymerization zone, which is preferably a gas phase reactor as described above, is then subjected to conventional post reactor treatment to remove i.a. the unreacted components.

Polymer Composition

According to the present invention, the polymer composition has a melt flow rate $MFR_2$ (2.16 kg, 230° C.) measured according to ISO 1133 in the range of 0.5 to 20.0 g/10 min, preferably in the range of 0.7 to 18.0 g/10 min, more preferably in the range of 1.0 to 16.0 g/10 min.

The polymer composition in the present invention may contain further polymer components and optionally additives and/or fillers. It is noted herein that additives may be present in polymer composition and/or mixed with the polymer composition e.g. in a compounding step for producing a polymer composition comprising the bi- or multimodal polyethylene and optional further polymer components additives and/or fillers.

The optional additives and fillers and the used amounts thereof are conventional in the field of film applications. Examples of such additives are, among others, antioxidants, process stabilizers, UV-stabilizers, pigments, fillers, antistatic additives, antiblocking agents, nucleating agents, acid scavengers as well as polymer processing agent (PPA).

It is understood herein that any of the additives and/or fillers can optionally be added in so-called master batch, which comprises the respective additive(s) together with a carrier polymer. In such a case the carrier polymer is not calculated to the polymer components of the polymer composition, but to the amount of the respective additive(s), based on the total amount of polymer composition (100 wt %).

Use of Polymer Composition

The present invention is not only directed to the instant polymer composition, but also to articles made therefrom. Accordingly, in a further embodiment the present invention is directed to articles, like films and moulded articles, comprising at least 70.0 wt %, preferably comprising at least 80.0 wt %, more preferably comprising at least 90.0 wt %, still more preferably comprising at least 95.0 wt %, yet more preferably comprising at least 99.0 wt %, of the polymer composition.

Preferably, the invention is directed to injection moulded articles comprising at least 90.0 wt % of the instant polymer composition designed for technical applications, like automotive applications.

Examples

1. Measuring Methods

The following definitions of terms and determination methods apply for the above general description of the invention as well as to the below examples unless otherwise defined.

Melt Flow Rate (MFR)

The melt flow rate (MFR) of the polymer composition is measured according to ISO 1133 (230° C., 2.16 kg load). The melt flow rate is measured as the $MFR_2$ in accordance with ISO 1133 (230° C., 2.16 kg load) for polypropylene and in accordance with ISO 1133 (190° C., 2.16 kg load) for polyethylene and is indicated in g/10 min. The MFR is an indication of the flowability, and hence the processability, of the polymer. The higher the melt flow rate, the lower the viscosity of the polymer.

Density

Density is measured according to ISO1183. Sample preparation is done by compression moulding in accordance with ISO 1873.

The Xylene Soluble Fraction at Room Temperature (XCS, Wt %)

The amount of the polymer soluble in xylene is determined at 25° C. according to ISO 16152; 5th edition; Jul. 1, 2005.

Intrinsic Viscosity (IV)

The intrinsic viscosity (IV) value increases with the molecular weight of a polymer. The IV values e.g. of the XCS were measured according to ISO 1628/1 in decalin at 135° C.

DSC Analysis, Melting Temperature (Tm), Melting Enthalpy (Hm), Crystallization Temperature (Tc) and Crystallization Enthalpy (Hc):

measured with a TA Instrument Q200 differential scanning calorimetry (DSC) on 5 to 7 mg samples. DSC is run according to ISO 30 11357/part 3/method C2 in a heat/cool/heat cycle with a scan rate of 10° C./min in the temperature range of −30 to +225° C. Crystallization temperature (Tc) and crystallization enthalpy (Hc) are determined from the cooling step, while melting temperature (Tm) and melting enthalpy (Hm) are determined from the second heating step respectively from the first heating step in case of the webs.

The glass transition temperature Tg is determined by dynamic mechanical thermal analysis according to ISO 6721-7. The measurements are done in torsion mode on compression moulded samples (40×10×1 mm3) between −100° C. and +150° C. with a heating rate of 2° C./min and a frequency of 1 Hz.

GPC (Mw, Mn, MWD)

Number average molecular weight (Mn), weight average molecular weight (Mw) and polydispersity (Mw/Mn) are determined by Gel Permeation Chromatography (GPC) according to the following method:

The weight average molecular weight Mw and the polydispersity (Mw/Mn, wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscometer was used with 3×TSK-gel columns (GMHXL-HT) from TosoHaas and 1,2,4-trichlorobenzene (TCB, stabilised with 200 mg/L 2,6-di tert butyl-4-methyl-phenol) as solvent at 145° C. and at a constant flow rate of 1 mL/min. 216.5 μL of sample solution were injected per analysis. The column set was calibrated using relative calibration with 19 narrow MWD polystyrene (PS) standards in the range of 0.5 kg/mol to 11 500 kg/mol and a set of well characterised broad polypropylene standards. All samples were prepared by dissolving 5-10 mg of polymer in 10 mL (at 160° C.) of stabilised TCB (same as mobile phase) and keeping for 3 hours with continuous shaking prior sampling in into the GPC instrument.

Rheological Properties:

Frequency Sweep Measurements for Determining RSI

Dynamic oscillatory shear experiments were conducted with an Anton Paar rheometer model: MCR 501A using ISO standard 6721-1 & 10 methods. Frequency sweep experiments at 190° C. and 25 mm parallel plate mode were run under nitrogen from 0.1 to 100 sec-1. Samples are typically 1.3 mm thick with care taken to ensure that the samples completely fill the gap between the upper and lower platens. Discrete relaxation spectra were calculated with the commercially available RSI TA software Oschestrator™ software package.

The numbers of relaxation modes calculated for the samples reported were typically 2 (N=2; i.e. the number of relaxation times per decade) with non-linear method.

First Moment of the Relaxation Spectrum—$\lambda_I$

The determination of the discrete relaxation time spectrum from the storage and loss modulus data (G', G" (w)) was done by the use of IRIS Rheo Hub 2008. The linear viscoelastic data (G', G" (w)) was obtained by frequency sweep measurements undertaken at 190° C., on a Anton Paar MCR 501 coupled with 25 mm parallel plates, applying a gap of 1.3 mm and a strain within linear viscoelastic regime. The underlying calculation principles used for the determination of the discrete relaxation spectrum are described elsewhere [1].

IRIS RheoHub 2008 expresses the relaxation time spectrum as a sum of N Maxwell modes $$\overset{\circ}{G}(t) = G_e . \sum_{1}^{N} g_i . e^{-\frac{t}{\lambda_i}}$$

wherein $g_i$ and $\lambda_i$ are material parameters and $G_e$ is the equilibrium modulus.

The choice for the maximum number of modes, N used for determination of the discrete relaxation spectrum, was done by using the option "optimum" from IRIS RheoHub 2008. The equilibrium modulus $G_e$ was set at zero.

The so-called first moment of the relaxation spectrum $\lambda_I$ can be described according to reference [2] as:

$$\lambda_I = \frac{\eta_0}{G_N^0} \quad [s]$$

in which, $\eta_0$ are $G_N^0$ values are taken from the "Rheological Constants" table retrieved by IRIS RheoHub 2008, after calculation of the relaxation spectra, using the procedure described above.

REFERENCES

1. Baumgärtel M, Winter HH, "Determination of the discrete relaxation and retardation time spectra from dynamic mechanical data", Rheol Acta 28:511519 (1989).
2. Structure and Rheology of Molten Polymers, John Dealy & Ronald G. Larson, Hanser 2006, pp 119.

Flexural Modulus

The flexural modulus was determined in 3-point-bending at 23° C. according to ISO 178 on 80×10×4 mm3 test bars injection moulded in line with EN ISO 1873-2.

Notched Impact Strength

The Charpy notched impact strength was measured according to ISO 179 1 eA at +23° C. and −20° C., using injection moulded bar test specimens of 80×10×4 $mm^3$ prepared in accordance with EN ISO 1873-2.

Haze

Haze determined according to ASTM D1003-00 on 60×60×1 mm3 plaques injection moulded in line with EN ISO 1873-2. Hazel denominates a haze value determined on 1 mm thick plaques.

Stress Whitening

Stress whitening is determined by a modified three point bending test, namely the reversed three point bending test, (cf. FIG. 1).

The reversed three point bending test is carried out on a universal testing machine (Zwick Z010) at 50 mm/min. The samples are 2 mm thick injection moulded UL94 specimens (125×12.5×2 mm).

The experimental set-up consists of the reversed three point bending test coupled with an optical detection system.

The mechanical set up consists of:

a fix part (1), with a span (2) of 40 mm, a moving part including a loading edge (3) with a light source (4) and an optical sensor (5) fixed on the moving part closely above and beneath the specimen (6) by a vertical rod. This ensures that the distance between light source and optical sensor remains constant during the test, which is a prerequisite for a good reproducibility of the measurements.

The force-deflection and the optical signal-deflection curves are recorded. At the beginning of the test, the optical signal (7) is calibrated to 100% (7*a*), regardless of the initial transparency/haziness of the inserted sample.

Occurrence of stress whitening is correlated with a sharp drop in the optical signal-deflection curve (cf. FIG. 2).

Three different parameters are determined:

a) Stress whitening angle,
b) Residual size (width) of the blushing zones
c) Stress whitening intensity a) The stress whitening angle [° ], (also: bending angle or onset-angle) indicates, at which bending angle stress whitening (SW) occurs. The occurrence of stress whitening is correlated with a sharp drop of the optical response (light transmission) during bending (cf. FIG. 2).

The onset angle for stress whitening is determined according to formula (VI):

$$\text{Onset angle}=(3*10^{-5}*s^4)-(2.1*10^{-3}*s^3)-(3.48*10^{-2}*s^2)+(6.4591*s)-0.9997 \quad (VI)$$

wherein

"s" denominates the deflection of the loading edge, at which the light transmission curve drops and is determined as illustrated in FIG. 2:

At the beginning of the test, the optical signal (7) is calibrated to 100% (7*a*), regardless of the initial transparency/haziness of the inserted sample. The deflection of the loading edge (s), at which the in the light transmission curve drops is determined by the abscissa-value (8) of the intersection between the tangent of the slope of the optical signal (7*b*) and the 100% line of the initial optical signal (7*a*)

b) Residual size (width) of the blushing zones immediately after a bending of 90°, measured in [mm], also denominated as "Res-SW 90°" or "residual stress whitening"; The width of a blushing zone (b) is determined as follows:

Tests are conducted to a deflection corresponding to an angle of $90^0$ according to the formula (VI) above. Then the specimen is abruptly unloaded with a crosshead speed of 400 mm/min. The width of the blushing area is measured immediately after testing using a slide gage.

c) Stress whitening intensity: this is the residual intensity of the blushing zone immediately after a bending of 90 deg. C. (visual appreciation from 0 to 5, with 0: no remaining blush, 5: intensive whitening), also denominated as "SW-intensity".

Evaluation of the Stress Whitening Intensity:

A mark of 0 is attributed when there is no residual blushing; a note of 5 when the whitening of the deformed zone is extremely pronounced. The obtained value is entered manually in a result sheet; average calculations are automated. The determination of these parameters is somewhat subjective and dependent on an operator. Although the obtained values are somewhat subjective they give essential information on the elastic recovery potential of the material.

What is important to notice, is:

a. an intensity of 0 is remarkably low (i.e. no blushing visible)

b. an intensity of up to 1 is excellent, c. an intensity between 1.1 and 1.5 is good;

d. an intensity between 1.6 and 3 is acceptable;

e. an intensity higher than 3 is insufficient.

2. Material Description

Heterophasic polypropylene copolymer (HECO):

The HECO used in IE1 and CE1 in the present invention is a heterophasic propylene-ethylene impact copolymer for cast and blown film extrusion with $MFR_2$ (230° C./2.16 kg) of 0.85 g/10 min, matrix MFR 1.1 g/10 min, a melting temperature Tm of 166° C., a total ethylene content of 8 wt %. The HECO is further characterized by an XCS content of 16.7 wt %, an IV(XCS) of 2.9 dl/g, and a density of 900 $kg/cm^3$. The ethylene content of the XCS fraction is 40.0 wt %.

Bi- or Multimodal Polyethylene (mPE):

The mPE used in IE1 in the present invention is a bimodal linear low density polyethylene (LLDPE) which is the example IE1 in EP3257895 A1 having a 1-butene content of 0.3 mol %, a 1-hexene content of 2.6 mol %, density of 0.918 $g/cm^3$ and a melt flow rate $MFR_2$ (190° C., 2.16 kg) of 1.5 g/10 min.

RSI* at 190° C. 4.71 nRSI [RSI/MFR2] 3.71 cRSI [RSI*MFR2*MWD] 22.13

The catalyst used for producing mPE was a metallocene catalyst with metallocene complex bis(1-methyl-3-n-butyl cyclopentadienyl)$Zr(IV)Cl_2$ (CAS no. 151840-68-5) supported on Albemarle ActivCat® carrier.

Polymerization was performed in a Borstar® plant comprising a prepolymerization loop reactor, a loop reactor and a gas phase reactor, whereby the slurry from the prepolymerization reactor was withdrawn intermittently and directed into the loop reactor, subsequently the slurry was withdrawn from the loop reactor intermittently by using settling legs and directed to a flash vessel operated at a temperature of 50° C. and a pressure of 3 bar and from there the polymer was directed to the gas phase reactor (GPR).

The production split (wt/Loop/wt % GPR components) was 42/58. The amount of the Sprepolymerzation product was calculated to the amount ofthe Loop product.

3. Examples

The polypropylene compositions were prepared by mixing in a co-rotating twin-screw extruder ZSK18 from Copernon with a typical screw configuration and a melt temperature in the range of 200-220° C. The melt strands were solidified in a water bath followed by strand pelletization. The specimen for IE1 and CE1 was injection moulded and characterized. The properties of the examples are listed in Table 1.

TABLE 1

Properties of the polymer compositions

| | Unit | IE1 | IE2 | IE3 | CE1 | CE2 | CE3 |
|---|---|---|---|---|---|---|---|
| HECO | wt % | 93 | 85 | 75 | 100 | 90 | 90 |
| mPE | wt % | 7 | 15 | 25 | 0 | 0 | 0 |
| Modifier* | wt % | 0 | 0 | 0 | 0 | 10 | 10 |
| $MFR_2$ | g/10 min | 1.0 | 1.1 | 1.1 | 0.85 | 0.9 | 1.3 |
| Flexural modulus | MPa | 1048 | 939 | 862 | 1105 | 1035 | 942 |
| Charpy NIS/23° C. | $kJ/m^2$ | 58.5 | 66.4 | 77.5 | 34.7 | 54.0 | 58.7 |
| Charpy NIS/−20° C. | $kJ/m^2$ | 3.70 | 3.7 | 5.8 | 3.7 | 4.3 | 4.5 |
| Haze/1 mm | % | 65 | 43 | 31 | 88 | 79 | 82 |
| Clarity | % | 90 | 95 | 96 | 77 | 83 | 80 |
| Tc | ° C. | 118 | 111 | 117 | 112 | 113 | 111 |
| Tm1 | ° C. | 166 | 166 | 166 | 165 | 165 | 165 |
| Tm2 | ° C. | 121 | 122 | 121 | — | 124 | 66 |
| Hm1 | J/g | 72 | 64 | 56 | 92 | 82 | 83 |
| Hm2 | J/g | 16 | 24 | 30 | 0 | 21 | 8 |
| SW angle | ° | 49.5 | 45.1 | 27.7 | 36.7 | 38.5 | 40.5 |
| SW intensity | — | 2 | 0 | 0 | 4 | 3 | 2 |
| Res. SW intensity | — | 3.12 | 0 | 0 | 3.56 | 3.6 | 2.5 |

*Modifier for CE2 was FB2230, a C2C4 linear low density polyethylene, commercially available from Borealis; $MRF_2$ (190° C.) 0.25 g/10 min; density 923 $kg/m^3$
Modifier for CE3 was Engage 8400, a C2C8 plastomer, commercially available from DOW, $MRF_2$ (190° C.) 30 g/10 min; density 870 $kg/m^3$ CE2 Corresponds to E7 of EP1510547

The data in Table 1 clearly show that the inventive example has good impact strength, low haze and diminished stress whitening in comparison to the comparative example. The data provided show that the object of the present invention is clearly fulfilled.

The invention claimed is:

1. A polymer composition comprising:

a) 95.0 to 70.0 wt % of a heterophasic propylene copolymer (HECO) comprising 70.0 to 90.0 wt % of a polypropylene matrix (M) and 10.0 to 30.0 wt % of an elastomeric propylene copolymer (EPC) dispersed in said matrix (M), wherein the ethylene comonomer content in the polypropylene matrix (M) is in the range of 0.0-10.0 wt % and wherein the heterophasic propylene copolymer (HECO) has a melt flow rate $MFR_2$ (2.16 kg, 230° C.) measured according to ISO 1133 in the range of 0.5 to 20.0 g/10 min, and b) 5.0 to 30.0 wt % of a bi- or multimodal polyethylene (mPE) being a linear low density polyethylene (LLDPE), and being a terpolymer of ethylene and two different comonomers selected from alpha olefins 1-butene and 1-hexene, and being produced with a metallocene catalyst, wherein the bi- or multimodal polyethylene terpolymer has:

i. an $MFR_2$ (2.16 kg, 190° C.) measured according to ISO 1133 of 0.5 to 10.0 g/10 min, ii. an MWD (Mw/Mn) of 2.0 to 7.0, and iii. a density measured according to ISO 1183 of 890 to 925 $kg/m^3$, wherein the bi- or multimodal polyethylene (mPE) comprises a first ethylene polymer component (A) in an amount of 35 to 60 wt %, having a melt flow rate $MFR_2$ (2.16 kg, 190° C.) measured according to ISO 1133 in the range of 1.0 to 10.0 g/10 min, and a second ethylene polymer component (B) in an amount of 40 to 65 wt %, having a melt flow rate $MFR_2$ (2.16 kg, 190° C.) measured according to ISO 1133 in the range of 0.2 to 1.0 g/10 min, wherein the bi- or multimodal polyethylene (mPE) is bi- or multimodal with respect to comonomer type insofar that the alpha-olefin comonomer of ethylene polymer component (A) is different from the alpha-olefin comonomer of ethylene polymer component (B), wherein the alpha-olefin comonomer of ethylene polymer component (A) is 1-butene and the alpha-olefin comonomer of ethylene polymer component (B) is 1-hexene, and wherein the bi- or multimodal polyethylene (mPE) is bi- or multimodal with respect to comonomer content, wherein the amount of comonomer in the ethylene polymer component (A) is from 0.05 to 0.9 mol %, and whereas the amount of comonomer in the ethylene polymer component (B) is from 1.0 to 5.0 mol %.

2. The polymer composition according to claim 1, wherein:

i. the xylene solubles fraction of the polypropylene matrix (M) is in the range of 1.0 wt % to 3.0 wt %, and/or ii. the melt flow rate $MFR_2$ (2.16 kg, 230° C.) measured according to ISO 1133 of the polypropylene matrix (M) is in the range of 0.3 to 30.0 g/10 min.

3. The polymer composition according to claim 1, wherein:

i. the xylene cold soluble (XCS) content of the heterophasic propylene copolymer (HECO) determined according ISO 16152 (25° C.) is in the range of 10.0 to 30.0 wt %, and/or ii. the intrinsic viscosity (IV) determined according to DIN ISO 1628/1 (in decalin at 135° C.) of the xylene cold soluble (XCS) fraction of the heterophasic propylene copolymer (HECO) is in the range of 1.5 to 4.5 dl/g, and/or iii. the ethylene comonomer content of xylene cold soluble (XCS) fraction of the heterophasic propylene copolymer (HECO) is in the range of 20.0 to 60.0 wt %.

4. The polymer composition according to claim 1, wherein the total ethylene comonomer content based on the amount of heterophasic propylene copolymer (HECO) is in the range of from more than 3.0 to 15.0 wt %.

5. The polymer composition according to claim 1, wherein the bi- or multimodal polyethylene (mPE) has:

i. a Relaxation Spectrum Index (RSI) (determined as defined in the description under Experimental part using frequency sweep at 190° C.) between 3.0 and 5.5 for the density range of 915 to <920 kg/m3 (according to ISO 1183) and between 6.8 and 9.0 for the density range of 920 to 925 kg/m3 (according to ISO 1183), ii. a normalized Relaxation Spectrum Index (nRSI) defined as RSI/MFR2 in the range of 3.0 to 10.0, and iii. a calculated Relaxation Spectrum Index (cRSI) defined as RSI*MFR2*MWD in the range of 12.0 to 50.

6. The polymer composition according to claim 1, wherein the bi- or multimodal polyethylene (mPE) is further bi- or multimodal with respect to a difference in density between the ethylene polymer component (A) and ethylene polymer component (B).

7. The polymer composition according to claim 1, wherein the polymer composition has a melt flow rate $MFR_2$ (2.16 kg, 230° C.) measured according to ISO 1133 in the range of 0.5 to 20.0 g/10 min.

8. An article comprising a polymer composition according to claim 1.

9. The article according to claim 8, wherein the article is a moulded article.

10. The article according to claim 8, wherein the article is a film.

11. The polymer composition according to claim 6, wherein the density of ethylene polymer component (A) is higher than the density of the ethylene polymer component (B); and wherein the density of the ethylene polymer component (A) being in the range of 930 to 950 $kg/m^3$.

* * * * *